3,253,403
NOZZLE HAVING ABLATIVE COATING
Edward J. Hayes, Livonia, Mich., assignor to Kelsey-Hayes Company, Romulus, Mich., a corporation of Delaware
Filed May 24, 1962, Ser. No. 197,339
2 Claims. (Cl. 60—35.6)

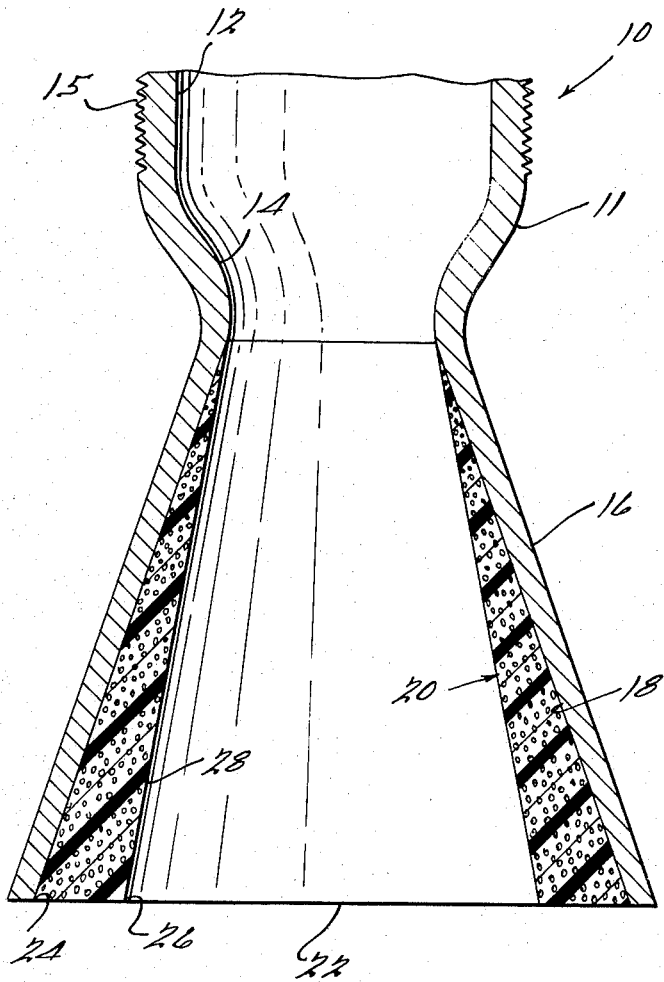

This invention relates to nozzles for directing the flow of hot gases and more particularly to exhaust nozzles for use on propulsively driven rockets, missiles, or the like.

In the propulsion of jet aircraft, rockets, or missiles, an exhaust nozzle assembly is utilized through which the hot burning gases are passed to thereby propel the vehicle. In order to prevent destruction of or damage to the nozzle due to the high temperatures of the hot gases, it is desirable that the nozzle be constructed with means to control or limit the maximum temperature to which it may be heated by the burning gases.

Therefore it is an object of this invention to provide a novel exhaust nozzle assembly having means for preventing the nozzle from reaching excessive temperatures.

As a rocket, missile, or jet aircraft attains higher altitudes, the external pressure changes. In order to optimize the performance of the nozzle with such reduction in external pressure, it is desirable that the ratio of the exit area or outlet of the nozzle to the area of the throat of the nozzle be increased; therefore, it is an object of this invention to provide a nozzle assembly for use with jet aircraft, rockets, missiles or the like, in which the ratio of the exit area of the nozzle to the area of the throat of the nozzle changes automatically.

It is a further object of this invention that a nozzle assembly be provided for use with jet aircraft, rockets, missiles or the like, in which the nozzle is prevented from reaching excessive temperatures and in which the nozzle automatically provides for an increase in the ratio of the exit area of the nozzle to the area of the throat of the nozzle.

Other objects, features, and advantages of the present invention will become apparent from the subsequent description and the appended claims, taken in conjunction with the accompanying drawing, in which:

The figure is a side elevational, sectional, fragmentary view depicting a nozzle assembly embodying the features of this invention.

Looking now to the drawing, a nozzle assembly is generally indicated by the numeral 10 and has a nozzle member 11 provided with a rearwardly disposed annular inlet portion 12 having a plurality of external threads 15 thereon to facilitate the attachment of the nozzle assembly 10 to a missile, rocket or other similar type aircraft. The inlet portion 12 extends forwardly and blends into a reduced area throat section 14 which in turn is integral with a generally conically shaped, outwardly flaring outlet portion 16. The cone portion 16 has an inner surface 18 which defines a preselected desired shape serving a purpose to be described.

The throat portion 14 can be coated with a lining formed of a composition of either tungsten, molybdenum or of high density graphite in order to withstand the high temperatures present due to the hot exhaust gases passing therethrough. Deposited or otherwise secured peripherally to the internal surface 18 of the conical outlet portion 16 is a lining 20 of an ablative material such as a mixture of Teflon (polytetrafluoroethylene) or the like and powdered quartz or the like which are bonded together by a suitable bonding agent such as a phenolic resin or the like. The characteristics of the ablative lining 20 is that the internal surface 28 thereof readily erodes upon the application of high temperatures thereto, i.e., as provided by the exhaust gases of a rocket, missile, or the like. With the surface of the ablative lining 20 continually being eroded away by the hot gases, the conical outlet portion 16 is prevented from reaching temperatures which might be damaging since, as soon as excessive temperatures are reached, the ablative lining 20 erodes away, thus preventing any appreciable heat transfer to the conical outlet portion 16. Thus with the nozzle assembly 10, the temperature of the outlet portion 16 of the nozzle 11 is prevented from attaining extremely high or damaging temperatures.

With missiles, rockets or other types of jet-propelled aircraft, it is desirable that, as the aircraft reaches higher altitudes and hence lower air densities and lower air pressures, the ratio of the area of the opening at the exit 22 to the area of the opening of the throat section 14 increases. By the use of an ablative material for the lining 20 on the internal surface 18 of the cone portion 16, means are provided whereby this change in ratio of areas is automatically accomplished. Thus as the vehicle is rising in altitude, the ablative lining 20 is being eroded while the throat 14 remains substantially unchanged thereby automatically increasing the area of the opening 22 and hence increasing the ratio of the exit area 22 to the area of the throat 14. With such a structure, the exit area 24 of the cone portion 16, as defined only by the internal surface 16 relative to the area of the throat 24, is selected to be at a desired optimum ratio depending upon the altitude to be reached and the pressures present thereat. Conversely, the exit area 26 defined by the internal surface 28 of the ablative lining 20 relative to the area of the throat portion 14 is provided to be an optimum for the conditions present in initially firing the missile, rocket, or other aircraft with which the nozzle assembly 10 is associated. By knowing the approximate velocity and trajectory of the vehicle, the erosion rate of the ablative material for the lining 20 can be selected to provide substantially the optimum ratio of exit to throat areas automatically throughout and coincidentally with the flight of the jet propulsed vehicle. To provide this desired ratio of areas, the ablative lining 20 is made substantially thicker at its exit 26 than at the throat end. Thus as shown in the drawing, the wall of the ablative lining 20 extends substantially from the exit area 22 to the throat section 14 and is formed at its exit 26 with a thick wall which tapers substantially to zero thickness at the throat section 14.

Thus with the nozzle assembly 10, the ablative lining 20 provides both a means for limiting the temperature attained by the cone-shaped portion 16 and also provides for automatic compensation for change in external pressure by automatically adjusting the ratio between the exit area and the throat area of the nozzle to a preselected desired ratio.

As noted previously, the hot gases passing through the nozzle are hotter at the end thereof adjacent the throat section 14. For this reason the ablative lining 20 may have a tendency to erode away faster at this end of the nozzle than at the exit end. This may be overcome by varying the density of the material of the lining so that its density is gradually increased toward the end thereof adjacent the throat section 14. This increase in density may be conveniently accomplished by increasing the ratio of quartz or the like to the Teflon or other light density material with which the quartz is mixed. Such a variation in density may be arranged to afford any desired pattern in the rate of ablation of the material of the lining 20.

While it will be apparent that the preferred embodiment of the invention disclosed is well calculated to fulfill the objects above stated, it will be appreciated that the invention is susceptible to modification, variation and

What is claimed is:

1. In a vehicle propulsively driven by hot gases, a discharge nozzle assembly comprising a nozzle member having an inlet end and an outlet end, means at said inlet end for securing said nozzle member to the vehicle, a reduced section throat portion on said nozzle member disposed between said inlet and said outlet ends, a generally radially outwardly flaring, conically shaped portion on said nozzle connected at one end to said throat portion and terminating at its other end in said outlet end and with said other end defining an opening having an area of a preselected desired ratio relative to the area of the opening defined by said throat portion for one flight condition, a lining composed of an ablative material disposed internally, peripherally on said conically shaped portion and extending substantially from said one end to said other end and with said lining defining an opening at said other end having an area of a preselected different ratio relative to the area of the opening defined by said throat portion for a different flight condition, the density of said lining increasing from one of its extremities to the other of its extremities.

2. The discharge nozzle assembly of claim 1 in which said lining is of an ablative material having a selected rate of erosion for automatically changing the ratio from said desired different ratio to said desired ratio in substantial coincidence with the vehicle moving from said different flight condition to said one flight condition, said density of said lining increasing from its extremity at said other end to its extremity at said one end.

References Cited by the Examiner

UNITED STATES PATENTS

| | | | |
|---|---|---|---|
| 2,206,057 | 7/1940 | Skinner | 60—35.6 |
| 2,835,107 | 5/1958 | Ward | 60—35.6 |
| 2,995,011 | 8/1961 | Kimmell | 60—35.6 |
| 3,022,190 | 2/1962 | Feldman | 60—35.6 |
| 3,048,970 | 8/1962 | Herzog | 60—35.6 |
| 3,069,845 | 12/1962 | Martin et al. | 60—35.6 |
| 3,073,111 | 1/1963 | Hasbrouck | 60—35.6 |
| 3,079,752 | 3/1963 | Thielman | 60—35.6 |
| 3,103,784 | 9/1963 | Vetter et al. | 60—35.6 |
| 3,142,960 | 8/1964 | Bluck | 60—35.6 |

FOREIGN PATENTS 991,228    6/1951    France.

OTHER REFERENCES

Astrolite publication, H. I. Thompson Fiber Glass Co. Products Bulletin No. PB 7–24A, July 1, 1959, pages 1–9 relied on.

MARK NEWMAN, *Primary Examiner.*

SAMUEL LEVINE, *Examiner.*

C. R. CROYLE, *Assistant Examiner.*